Aug. 5, 1924.
A. P. LOWER
FISHING LINE FLOAT
Filed May 29 1923
1,504,065
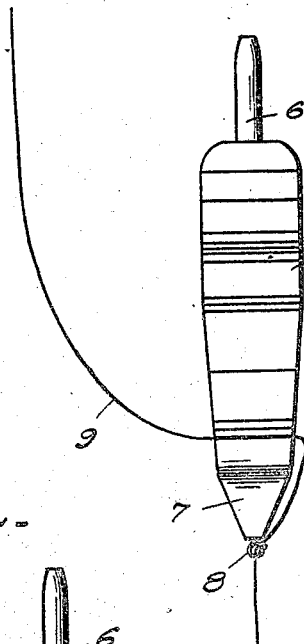
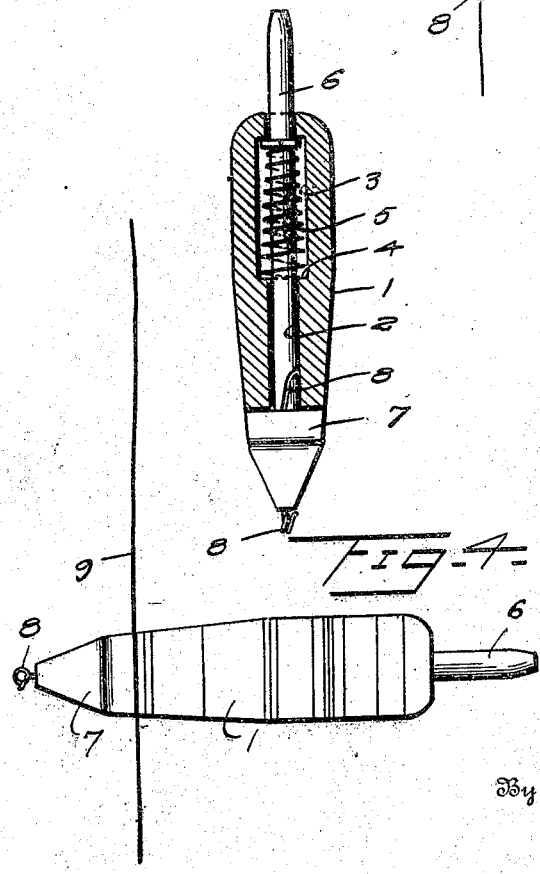
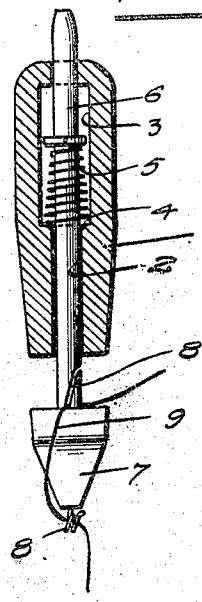
Inventor
A. P. Lower Patented Aug. 5, 1924.

1,504,065

UNITED STATES PATENT OFFICE.

ALFRED P. LOWER, OF BRADFORD, OHIO.

FISHING-LINE FLOAT.

Application filed May 29, 1923. Serial No. 642,248.

*To all whom it may concern:*

Be it known that I, ALFRED P. LOWER, a citizen of the United States, residing at Bradford, in the county of Miami and State of Ohio, have invented certain new and useful Improvements in Fishing-Line Floats; and I do hereby declare the following to be a full, clear, and exact description of the invention, such as will enable others skilled in the art to which it appertains to make and use the same.

This invention has relation to a float or bob for fishing lines and has for its object the provision of an article of the character aforesaid which may be clamped to a fishing line so as to occupy either a vertical or horizontal position, as required, and which will obviate injury to the line and enable the float to be readily adjusted in any desired position, or removed from or applied to the line.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is an elevational view showing the float applied to a fishing line in such a manner as to occupy a vertical position when in service, Figure 2 is a central longitudinal section of the float, the stem, spring and the enlarged end of the stem being in full lines, Figure 3 is a view similar to Figure 2, the stem being moved relatively to the body of the float to expose the line receiving slot, and Figure 4 is a view of the float in horizontal position.

Corresponding and like parts are referred to in the following description and designated in the several views of the drawings by like reference characters.

The float comprises a body 1 which approximates the outline of a torpedo and in which is formed an axial opening 2 which is enlarged at one end, as indicated at 3, whereby to form an inner shoulder 4 which provides a seat for a helical spring 5 which is preferably tapered slightly throughout its length. A stem 6 is freely movable in the opening 2 and is of a length to project beyond opposite ends of the body 1. One end of the stem 6 is enlarged, as indicated at 7, and is of tapering form to correspond with the outline of the float. A clip 8 is applied to the point of the tapered end 7. The body 1 may be of any light material and preferably consists of cork which is finished in any preferred way. The stem 6 has a loose fit in the opening 2 so as not to bind therein, even though the parts should be affected by moisture or climatic conditions. A slot 8 is formed in the stem 6 adjacent the enlarged end 7 and open through a side of the stem a short distance from the enlargement 7 to admit of placing the line 9 in position or removing it from the float. The spring 5 is mounted upon the stem 6 and its inner end engages the shoulder 4 and its upper end is clinched about or otherwise secured to the stem 6. The spring is located wholly within the body 1 and is under tension at all times to hold the enlargement 7 against the adjacent end of the body 1, whereby to clamp the line 9 and hold the same in the required adjusted position. The spring 5 may be of brass or finished in any manner so as not to be affected by moisture.

When the stem 6 is pressed within the body 1 a distance to expose the slot 8, the spring 5 is depressed and the line 9 may be introduced into the slot 8 or removed therefrom, as required. When the line is applied to the float, it is clamped between the enlargement 7 of the stem and the adjacent end of the body 1 and in this position, the float will occupy an approximately horizontal position when in service. By engaging the line 9 with the clip 8, the float will occupy an upright or vertical position when in service. These two positions are shown in Figures 4 and 1, respectively.

What is claimed is:

1. A fishing line float comprising an elongated body having an axial opening therethrough, a stem freely movable in said axial opening and having an enlargement at one end, and a line receiving slot adjacent said enlargement, and a helical spring mounted upon the stem and coacting therewith and with the body to clamp the line between the enlargement of the stem and the adjacent end of the body.

2. A fishing line float comprising an elongated body having an axial opening which is enlarged at one end, a stem movable freely in the axial opening and having an enlargement at one end and a line receiving slot adjacent the enlargement, and a helical spring disposed within the enlarged portion of said axial opening and mounted upon the stem and engaging the latter at its outer end and engaging the shoulder at the inner end of the enlarged portion of said axial opening.

In testimony whereof I affix my signature in presence of two witnesses.

ALFRED P. LOWER.

Witnesses:
JOHN L. PARIN,
LAVINA V. HARTLE.